(12) United States Patent
Sun

(10) Patent No.: US 8,030,869 B2
(45) Date of Patent: Oct. 4, 2011

(54) DRIVE AMPLIFIER SYSTEM AND OVER-CURRENT DETECTION METHOD FOR THE SAME

(75) Inventor: Chia-Hung Sun, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 526 days.

(21) Appl. No.: 12/334,544

(22) Filed: Dec. 15, 2008

(65) Prior Publication Data

US 2010/0110597 A1    May 6, 2010

(30) Foreign Application Priority Data

Oct. 31, 2008    (CN) .......................... 2008 1 0305339

(51) Int. Cl.
*H02H 3/08* (2006.01)
*H02H 7/085* (2006.01)

(52) U.S. Cl. ......................................... 318/434; 361/31

(58) Field of Classification Search .................. 318/434, 318/438, 490, 558, 563, 565, 650; 361/23, 361/31, 78, 87
See application file for complete search history.

(56) References Cited

U.S. PATENT DOCUMENTS

| 6,894,463 | B2* | 5/2005 | Kernahan ..................... 323/267 |
| 7,276,815 | B2* | 10/2007 | Algrain et al. .................. 307/80 |
| 2003/0197993 | A1* | 10/2003 | Mirowski et al. ............. 361/93.2 |
| 2006/0082944 | A1* | 4/2006 | Koyanagi et al. ............. 361/93.1 |
| 2010/0027170 | A1* | 2/2010 | Kishimoto ....................... 361/31 |

* cited by examiner

*Primary Examiner* — Bentsu Ro
(74) *Attorney, Agent, or Firm* — Altis Law Group, Inc.

(57) ABSTRACT

A drive amplifier system includes a drive control device, a power supply, and at least one drive amplifier. The power supply includes a power control circuit, a rectifier, and a current sensor. The power control circuit includes an over-current detection circuit, a controller, and a state comparator. The drive amplifier includes a control circuit, a state memory, and an inverting circuit. When a actual current provided for the at least one drive amplifier by the power supply is more than a reference voltage, the over-current detection circuit outputs an over-current detection signal.

18 Claims, 3 Drawing Sheets

DRIVE AMPLIFIER SYSTEM AND OVER-CURRENT DETECTION METHOD FOR THE SAME

BACKGROUND

1. Technical Field

The present disclosure relates to a drive amplifier system and an over-current detection method for the system.

2. Description of the Related Art

A general drive amplifier system includes a plurality of drive amplifiers connected to a power supply to drive a plurality of corresponding motors. Each of the amplifiers has a predetermined over-current rating when it is manufactured. The over-current rating is the most current at which the drive amplifier can work normally. Generally, the drive amplifier system adds up the rated over-current values of all the amplifiers to obtain a reference current value, and compares the reference current value with the actual current provided by the power supply for the amplifiers. When the actual current is greater than the reference current value, the drive amplifier system outputs an over-current detection signal. However, in practice, not all the drive amplifiers work at the same time. Therefore, over-current value of an amplifier not working at the moment is included in the reference current value. Therefore, over-current detection of the drive amplifier is not precise.

DETAILED DESCRIPTION

Figure 1:
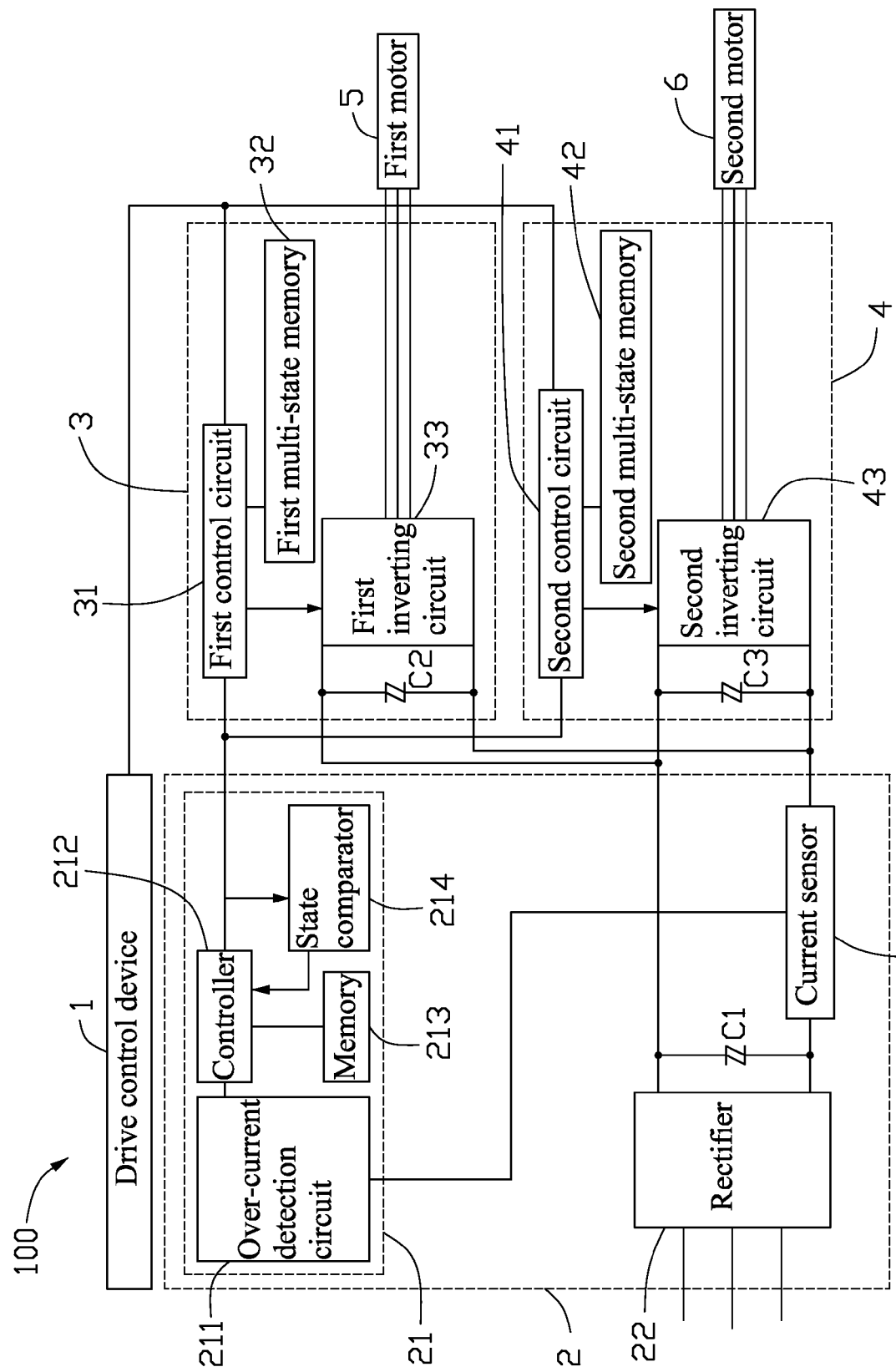
FIG. 1 is a block diagram of an exemplary embodiment of a drive amplifier system, the drive amplifier system including a state memory and a state comparator.

Referring to FIG. 1, an exemplary embodiment of a drive amplifier system 100 includes a drive control device 1, a power supply 2, and two drive amplifiers including a first amplifier 3, and a second amplifier 4. The first amplifier 3 is configured for driving a first motor 5. The second amplifier 4 is configured for driving a second motor 6. The drive control device 1 is configured for providing drive commands to the first amplifier 3 and the second amplifier 4, to drive the first motor 5 and the second motor 6 correspondingly. Depending on the embodiment, the drive control device 1 may be a personal computer for example, but the disclosure is not limited thereto.

The power supply 2 includes a power control circuit 21, a rectifier 22, a current sensor 23, and a first smoothing capacitor C1. The power control circuit 21 includes a controller 212 connect to an over-current detection circuit 211, a memory 213, and a state comparator 214. The over-current detection circuit 211 is also connected to the current sensor 23. The rectifier 22 is configured for converting alternating current from a main power supply into direct current to supply the first and second amps 3, 4. The current sensor 23 is configured for sensing how much actual current is supplied to the first and second amps 3, 4 by the rectifier 22, and transmitting an actual current value to the over-current detection circuit 211. The first smoothing capacitor C1 is connected to output terminals of the rectifier 22 in parallel for smoothing and filtering the current signals. The main power supply, in one example, may be a commercial power supply that provides 220V AC.

The first amplifier 3 includes a first control circuit 31, a first state memory 32, a first inverting circuit 33, and a second smoothing capacitor C2. The second amplifier 4 includes a second control circuit 41, a second state memory 42, a second inverting circuit 43, and a third smoothing capacitor C3. The first state memory 32 and the first inverting circuit 33 are connected to the first control circuit 31. The second state memory 42 and the second inverting circuit 43 are connected to the second control circuit 41. The first and second control circuits 31, 41 are connected to the controller 212 to receive a read command from the controller 212 and transmit information stored in the first and second state memories 32, 42 to the state comparator 214. The first and second control circuits 31 and 41 are also connected to the drive control device 1 to receive the drive commands from the drive control device 1 to control the first and second inverting circuits 33, 43 correspondingly. The first and second inverting circuits 33, 43 are connected to an output terminal of the rectifier 22 to convert the direct current from the rectifier 22 to alternating current for the first and second motors 5, 6 correspondingly. The second and third smoothing capacitors C2, C3 are respectively connected in parallel to input terminals of the corresponding first and second inverting circuits 33, 43 for smoothing and filtering the current signals.

Figure 2:
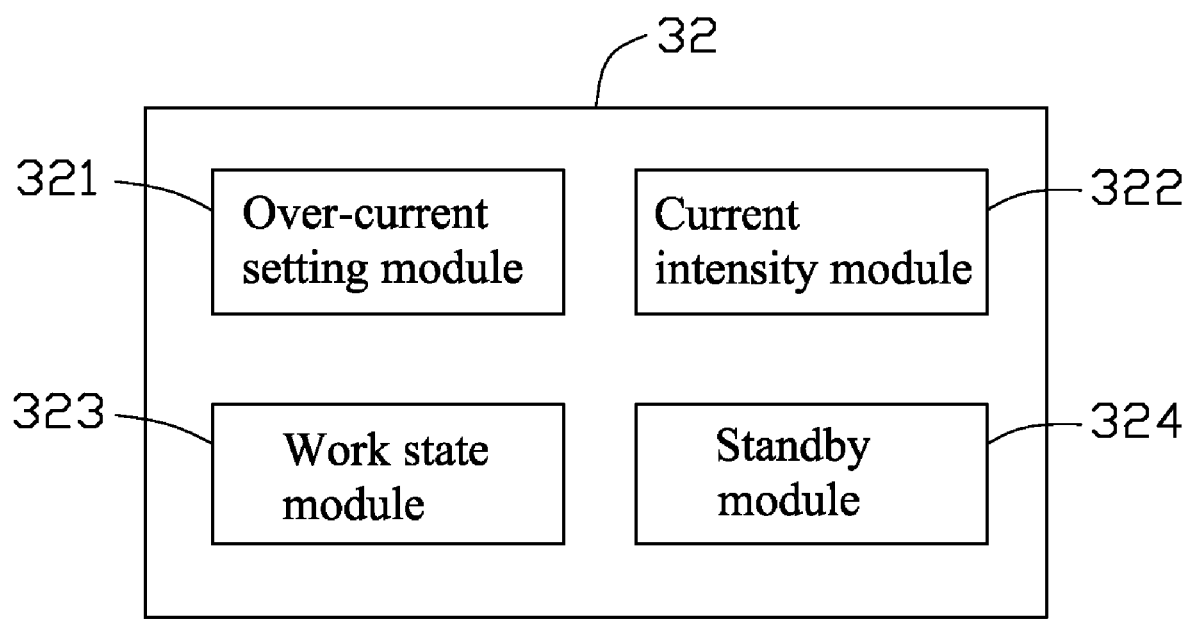
FIG. 2 is a block diagram of an exemplary embodiment of the state memory in FIG. 1.

Referring to FIG. 2, the first state memory 32 includes an over-current setting module 321, a current intensity module 322, a work state module 323, and a standby module 324. The over-current setting module 321 stores a predetermined over-current value of the first amplifier 3. The current intensity module 322 stores a plurality of current percentages of the first amplifier 3 correspondingly associated with different working conditions of the first motor 5. The work state module 323 stores a plurality of work states of the first amplifier 3. The work states may include, for example, a work state 1 meaning that the first amplifier 3 is working, and a work state 0 meaning that the first amplifier 3 is not working. The standby module 324 is configured for storing other information of the first amplifier 3, such as a manufacturing date and a product serial number of the first amplifier 3, and so on.

An example will be used to explain the over-current value and the current percentages of the first amplifier 3 mentioned above. As mentioned above, the over-current value is predetermined when the amplifier 3 is manufactured and is the most current allowed by the first amplifier 3 for working normally. Generally, the over-current value of the amplifier 3 is more than a current rating of the first motor 5, which is connected to the first amplifier 3. The plurality of current percentages are associated with a plurality of current commands stored in the current intensity module 322. The controller 212 selects a current percentage from the current intensity module 322 of the first amplifier 3 via the first control circuit 31 to make the first amplifier 3 drive the first motor 5 using a required current. For example, when a current rating of the first motor 5 is about 10 A, an over-current value of the first amplifier 3 is predetermined to be about 15 A, which is greater than the current rating of about 10 A of the first motor 5. When it is needed that the first motor 5 work at 80% of the current rating, the controller 212 invokes a current percentage of 80% from the current intensity module 322 and transmits the associated current command to the first control circuit 31 of the first amplifier 3. Thus, a required current provided by the power supply 2 for the first motor 5 via the first amplifier 3 is 10 A*80%=8 A. However, the most current of the first amplifier 3 should be less than a product of the over-current value and the current percentage, that is about 15 A*80%=12 A. 12 A will then be added to a protection total of the over-current detection of the drive amplifier system. The total is obtained by adding up all the products of the over-current values and the selected current percentages of the first amplifier 3 and the second driver amplifier 5.

The second state memory 42 has the same configuration and function as the first state memory 32. Thus, a detailed description of the configuration and operation of the second state memory 42 is omitted for brevity.

Figure 3:
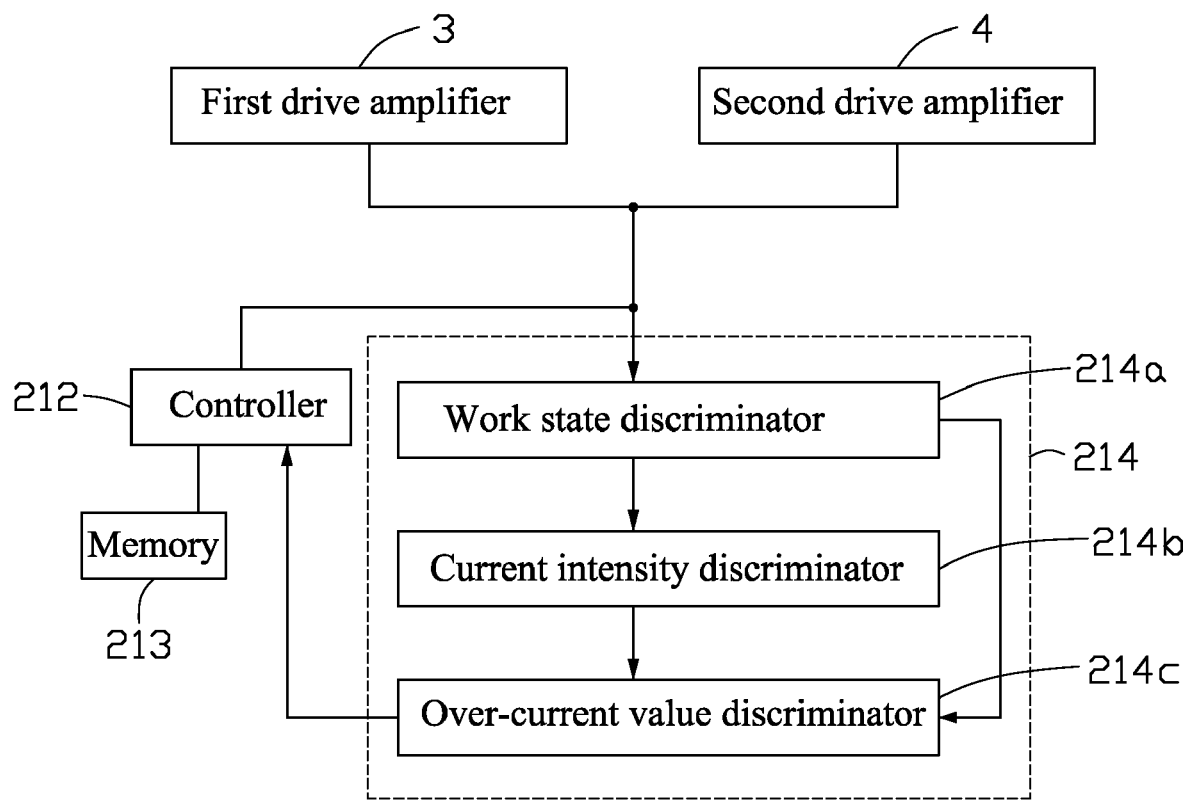
FIG. 3 is a block diagram of an exemplary embodiment of the state comparator in FIG. 1.

Referring to FIG. 3, the state comparator 214 includes a work state discriminator 214a, a current intensity discriminator 214b, and an over-current discriminator 214c. The work state discriminator 214a determines and reads the work states of the first amplifier 3 and the second amplifier 4 from the corresponding work state module. When a corresponding drive amplifier is not working, for example, the first amplifier 3 is not working, the work state of the first amplifier 3 is predetermined as 0, and the work state discriminator 214a does not output the over-current value of the first amplifier 3. When a corresponding drive amplifier is working, for example, the first amplifier 3 is working, the work state of the first amplifier 3 is predetermined as 1, and the work state discriminator 214a transmits the over-current value of the first amplifier 3 to the current intensity discriminator 214b. The current intensity discriminator 214b determines the current intensity of the first amplifier 3 and reads a current percentage stored in the current intensity module 322, and then transmits the current percentage and the over-current value to the over-current discriminator 214c. The over-current value is multiplied by the current percentage in the over-current discriminator 214c to obtain a product. Then, the products of the over-current values and the corresponding current percentages of the first amplifier 3 and the second amplifier 4 are added up to obtain the total. The total functioning as a reference current value is transmitted to the controller 212 for the over-current detection.

In use, the drive control device 1 provides the drive commands for the first and second control circuits 31, 41 to control the first and second inverting circuits 33, 44 correspondingly. Therefore, the power supply 2 supplies power for the first and second motors 5, 6 via the first and second inverting circuit 33, 44 correspondingly. At the same time, the controller 212 invokes the reference current value from the state comparator 214, and transmits the reference current value to the memory 213. The memory 213 stores the reference current value and transmits the reference current value to the over-current detection circuit 211. The over-current detection circuit 211 compares the reference current value with the actual current value sensed by the current sensor 23 from each of the first amplifier 3 and the second amplifier 4. When the actual current value is more than the reference current value, the over-current detection circuit 211 outputs an over-current detection signal. When the actual current value is not more than the reference current value, the over-current detection circuit does not output the over-current detection signal.

In one exemplary embodiment, the current intensity module in each state memory of the first amplifier 3 and the second amplifier 4 can be omitted, and the current intensity discriminator 214b in the state comparator 214 can be omitted. Therefore, the work state discriminator 214a determines the work states of both the first amplifier 3 and the second amplifier 4. The over-current values of the drive amplifiers which are working are totaled. The total then is taken as the reference current value and transmitted to the over-current detection circuit 211.

In other exemplary embodiments, the drive amplifier system 100 may include one drive amplifier or more than two drive amplifiers. The one drive amplifier or each of the more than two drive amplifiers has the same configuration and connections as the first amplifier 3 and the second amplifier 4.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A drive amplifier system for driving at least one motor, comprising:
   a drive control device configured for providing at least one drive command;
   at least one drive amplifier connected to the drive control device configured for receiving the at least one drive command, and configured to drive the at least one motor, each of the at least one drive amplifiers comprising:
   a control circuit configured for receiving the at least one drive command to drive a corresponding motor of the at least one motor; and
   a state memory comprising:
     an over-current setting module configured for storing an over-current value of each of the at least one drive amplifiers; and
     a work state module configured for storing a work state of each of the at least one drive amplifiers; and
   a power supply configured for providing power for the at least one drive amplifier to drive the at least one motor correspondingly, comprising:
     a current sensor configured for sensing a actual current value provided by the power supply for the at least one drive amplifier, and
     a power control circuit comprising:
       a state comparator comprising a work state discriminator configured for determining a work state of each of the at least one drive amplifiers and outputting an over-current value of the at least one drive amplifier that is working, and an over-current value discriminator for receiving the over-current value from the work state discriminator and adding up the over-current values of each of the at least one drive amplifiers that are working to get a total over-current value, and outputting the total over-current value functioning as a reference current value;
       a controller configured for receiving the reference current value and outputting the reference current value; and
       an over-current detection circuit configured for receiving the reference current value from the controller and the actual current value from the current sensor to compare the reference current value with the actual current value; wherein the over-current detection circuit outputs an over-current detection signal in response to the actual current value being more than the reference current value.

2. The system of claim 1, wherein the power control circuit further comprises a memory connected to the controller; wherein the memory is configured for storing the reference current value.

3. The system of claim 1, wherein the power supply further comprises a rectifier connected to the at least one drive amplifier; wherein the rectifier is configured for converting alternating current from a main power supply into direct current.

4. The system of claim 3, wherein the power supply still further comprises a smoothing capacitor connected to output terminals of the rectifier in parallel for smoothing and filtering current signals.

5. The system of claim 3, wherein each of the at least one drive amplifiers comprises an inverting circuit connected to the rectifier; wherein the inverting circuit is configured for converting direct current from the rectifier into alternating current for a corresponding motor of the at least one motor.

6. The system of claim 5, wherein each of the at least one drive amplifiers further comprises a smoothing capacitor connected to input terminals of the inverting circuit in parallel for smoothing and filtering current signals.

7. A drive amplifier method for driving at least one motor, comprising:
   providing at least one drive amplifiers, each having an over-current value;
   determining whether each of at least one drive amplifiers is working, and reading an over-current value of each of at least one drive amplifiers that is working;
   adding up the over-current values of each the at least drive amplifiers which are working to get a total over-current value by a state comparator, and transmitting the total over-current value as a reference current value to a controller;
   transmitting the reference current value to an over-current detection circuit by the controller, wherein the over-current detection circuit compares the reference current value with a actual current value provided for the at least one drive amplifier; and
   outputting an over-current detection signal by the over-current detection circuit when the actual current value is more than the reference current value.

8. The method of claim 7, wherein a memory is connected to the controller and configured for storing the reference current value.

9. The method of claim 7, wherein a rectifier is connected to the at least one drive amplifier and configured for converting alternating current into direct current.

10. The method of claim 9, wherein a smoothing capacitor is connected to output terminals of the rectifier in parallel for smoothing and filtering current signals.

11. The method of claim 9, wherein each inverting circuit of the at least one drive amplifiers comprises is connected to the rectifier and configured for converting direct current into alternating current for a corresponding motor of the at least one motor.

12. The method of claim 11, wherein a smoothing capacitor is connected to input terminals of the inverting circuit in parallel for smoothing and filtering current signals.

13. A drive amplifier system for driving at least one motor, comprising:
   a drive control device configured for providing at least one drive command;
   at least one drive amplifier connected to the drive control device configured for receiving the at least one drive command, and configured to drive the at least one motor, each of the at least one drive amplifiers comprising:
      a control circuit configured for receiving the at least one drive command to drive a corresponding motor of the at least one motor; and
      a state memory comprising:
         an over-current setting module configured for storing an over-current value of each of the at least one drive amplifiers; and
         a work state module configured for storing a work state of each of the at least one drive amplifiers; and
         a current intensity module configured for storing current percentages of each of the at least one drive amplifiers; and
   a power supply configured for providing power for the at least one drive amplifier to drive the at least one motor correspondingly, comprising:
      a current sensor configured for sensing a actual current value provided by the power supply for the at least one drive amplifier, and
      a power control circuit comprising:
         a state comparator comprising
            a work state discriminator configured for determining a work state of each of the at least one drive amplifiers and outputting an over-current value of each of the at least one drive amplifiers that is working;
            a current intensity discriminator configured for receiving the over-current value of each of the at least one drive amplifiers and determining the current percentage of a corresponding drive amplifier of the at least one drive amplifier, and then outputting the over-current value and the current percentage; and
            an over-current value discriminator configured for receiving the over-current value and the current percentage from the current intensity discriminator and adding up product of the over-current value and the current percentage of each of the at least one drive amplifiers that are working to, get a total over-current value and outputting the total over-current value functioning as a reference current value;
         a controller configured for receiving the reference current value and outputting the reference current value; and
         an over-current detection circuit configured for receiving the reference current value from the controller and the actual current value from the current sensor to compare the reference current value with the actual current value; wherein the over-current detection circuit outputs an over-current detection signal when the actual current value is more than the reference current value.

14. The system of claim 13, wherein the power control circuit further comprises a memory connected to the controller; wherein the memory is configured for storing the reference current value.

15. The system of claim 13, wherein the power supply further comprises a rectifier connected to the at least one drive amplifier, wherein the rectifier is configured for converting alternating current from a main power supply into direct current.

16. The system of claim 15, wherein the power supply still further comprises a smoothing capacitor connected to output terminals of the rectifier in parallel for smoothing and filtering current signals.

17. The system of claim 15, wherein each of the at least one drive amplifiers comprises a inverting circuit connected to the rectifier; wherein the inverting circuit is configured for converting direct current from the rectifier into alternating current for a corresponding motor of the at least one motor.

18. The system of claim 17, wherein each of the at least one drive amplifiers further comprises a smoothing capacitor connected to input terminals of the inverting circuit in parallel for smoothing and filtering current signals.

* * * * *